US012264613B2

(12) United States Patent
Watabe et al.

(10) Patent No.: US 12,264,613 B2
(45) Date of Patent: Apr. 1, 2025

(54) CENTRIFUGAL COMPRESSOR AND TURBOCHARGER

(71) Applicant: MITSUBISHI HEAVY INDUSTRIES ENGINE & TURBOCHARGER, LTD., Sagamihara (JP)

(72) Inventors: Shotaro Watabe, Tokyo (JP); Kenichiro Iwakiri, Tokyo (JP); Yutaka Fujita, Tokyo (JP); Yuki Yamada, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/289,059

(22) PCT Filed: Aug. 2, 2021

(86) PCT No.: PCT/JP2021/028667

§ 371 (c)(1),
(2) Date: Oct. 31, 2023

(87) PCT Pub. No.: WO2023/012882

PCT Pub. Date: Feb. 9, 2023

(65) Prior Publication Data

US 2024/0229707 A1 Jul. 11, 2024

(51) Int. Cl.

| | |
|---|---|
| ***F02B 37/16*** | (2006.01) |
| ***F01D 17/10*** | (2006.01) |
| ***F02B 39/00*** | (2006.01) |

(52) U.S. Cl.

CPC ............ *F02B 37/16* (2013.01); *F01D 17/105* (2013.01); *F02B 39/00* (2013.01); *F05D 2220/40* (2013.01); *F05D 2260/606* (2013.01)

(58) Field of Classification Search

CPC .......... F02B 37/16; F02B 39/00; F02B 39/16; F01D 17/105; F05D 2220/40; F05D 2260/606

See application file for complete search history.

(56) References Cited

U.S. PATENT DOCUMENTS

2012/0073287 A1 3/2012 Kang et al.
2012/0121400 A1 5/2012 Tomita et al.

(Continued)

FOREIGN PATENT DOCUMENTS

DE 10. 2008 014 681 A1 10/2009
JP 2000-87752 A 3/2000

(Continued)

OTHER PUBLICATIONS

International Preliminary Report on Patentability and Written Opinion of the International Searching Authority for International Application No. PCT/JP2021/028667, dated Feb. 15, 2024, with an English translation.

(Continued)

*Primary Examiner* — J. Todd Newton
(74) *Attorney, Agent, or Firm* — Birch, Stewart, Kolasch & Birch, LLP

(57) ABSTRACT

In this centrifugal compressor, when a passage cross-section of a bypass passage at a connection point where the bypass passage and a compressor inlet passage are connected to each other is defined as an outlet cross-section of the bypass passage, a range of the outlet cross-section on the downstream side of the center of the outlet cross-section in the axial direction of an impeller and on the upstream side of the center in the rotation direction of the impeller is defined as a first range, and a portion of a passage wall surface of the bypass passage at the outlet cross-section that belongs to the first range is defined as a first-range wall surface portion, at least the first-range wall surface portion of the passage wall (Continued)

surface of the bypass passage at the outlet cross-section is formed from a curved line.

10 Claims, 9 Drawing Sheets

(56) References Cited

U.S. PATENT DOCUMENTS

| | | | |
|---|---|---|---|
| 2018/0094647 A1 | 4/2018 | Puzik et al. | |
| 2020/0291847 A1 | 9/2020 | Hoshi et al. | |
| 2021/0033103 A1* | 2/2021 | Hayashi .............. | F04D 27/0215 |
| 2021/0108647 A1 | 4/2021 | Iwakiri et al. | |

FOREIGN PATENT DOCUMENTS

| | | |
|---|---|---|
| JP | 2007-127109 A | 5/2007 |
| JP | 2012-62822 A | 3/2012 |
| JP | 2015-151991 A | 8/2015 |
| JP | 2015-165110 A | 9/2015 |
| JP | 2017-15026 A | 1/2017 |
| JP | 2018-513302 A | 5/2018 |
| WO | WO 2011/045975 A1 | 4/2011 |
| WO | WO 2019/111370 A1 | 6/2019 |
| WO | WO 2020/008615 A1 | 1/2020 |
| WO | WO 2020/012648 A1 | 1/2020 |
| WO | WO 2020/166426 A1 | 8/2020 |

OTHER PUBLICATIONS

International Search Report and Written Opinion of the International Searching Authority for International Application No. PCT/JP2021/028667, dated Oct. 19, 2021.

* cited by examiner

CENTRIFUGAL COMPRESSOR AND TURBOCHARGER

TECHNICAL FIELD

The present disclosure relates to a centrifugal compressor and a turbocharger.

BACKGROUND ART

For example, as described in PTL 1, in the case of a centrifugal compressor for a turbocharger, an outlet of the centrifugal compressor may be provided with a bypass valve (also called a blow-off valve or a recirculation valve) for prevention of an excessive increase in discharge pressure of a compressor. In such a configuration, the bypass valve is opened when the discharge pressure of the compressor becomes excessive, and discharge air of the compressor is returned to an inlet side of the compressor via a bypass flow path.

CITATION LIST

Patent Literature

[PTL 1] International Publication No. WO 2020/008615

SUMMARY OF INVENTION

Technical Problem

According to the knowledge of the inventor of the present application, in the above-described centrifugal compressor including the bypass flow path, noise is generated in some cases when a backflow from an impeller side occurs at a connection portion between a compressor inlet flow path, through which air is guided to an impeller, and the bypass flow path.

In view of the above circumstances, an object of at least one embodiment of the present disclosure is to provide a centrifugal compressor with which it is possible to reduce noise generated at a connection portion between a compressor inlet flow path and a bypass flow path and to provide a turbocharger including the same.

Solution to Problem

In order to achieve the above-described object, at least one embodiment of the present disclosure provides a centrifugal compressor including an impeller, a compressor inlet flow path through which air is guided to the impeller, a scroll flow path that is provided on an outer peripheral side of the impeller, and a bypass flow path that branches off from the scroll flow path, that bypasses the impeller, and that is connected to the compressor inlet flow path, in which, in a case where an outlet cross section of the bypass flow path refers to a flow path cross section of the bypass flow path at a connection position where the bypass flow path and the compressor inlet flow path are connected to each other, a first area refers to an area of the outlet cross section that is closer to a downstream side in an axial direction of the impeller than a center of the outlet cross section is and that is closer to an upstream side in a rotation direction of the impeller than the center is, and a first area wall surface portion refers to a portion of a flow path wall surface of the bypass flow path at the outlet cross section that belongs to the first area, at least the first area wall surface portion of the flow path wall surface of the bypass flow path at the outlet cross section is composed of a curve.

In order to achieve the above-described object, at least one embodiment of the present disclosure provides a turbocharger including the above-described centrifugal compressor and a turbine that is connected to the centrifugal compressor via a rotary shaft.

Advantageous Effects of Invention

According to at least one embodiment of the present disclosure, there is provided a centrifugal compressor with which it is possible to reduce noise generated at a connection portion between a compressor inlet flow path and a bypass flow path and to provide a turbocharger including the same.

DESCRIPTION OF EMBODIMENTS

Figure 1:
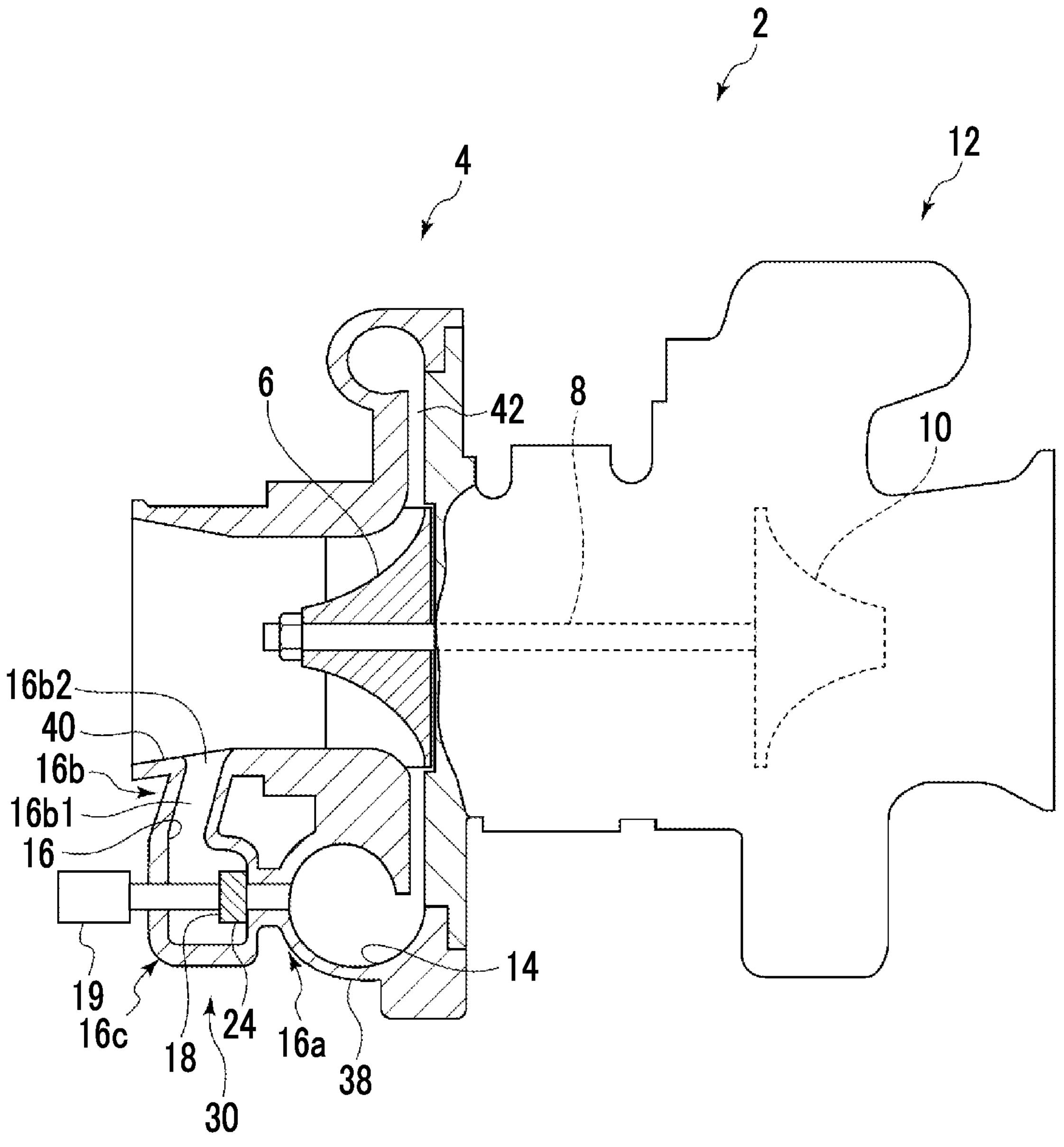
FIG. 1 is a partial cross-sectional view showing a schematic configuration of a turbocharger 2 according to an embodiment.

Hereinafter, some embodiments of the present disclosure will be described with reference to the accompanying drawings. Dimensions, materials, shapes, relative arrangements, and the like of components described as embodiments or illustrated in the drawings are not intended to limit the scope of the invention, but are merely explanatory examples.

For example, an expression representing a relative or absolute arrangement such as "in a certain direction", "along a certain direction", "parallel", "orthogonal", "center", “concentric”, or “coaxial” does not strictly represent only such an arrangement, but also a tolerance or a state of being relatively displaced with an angle or a distance to the extent that the same function can be obtained.

For example, expressions such as “identical”, “equal”, and “homogeneous” indicating that things are in an equal state do not strictly represent only the equal state, but also a tolerance or a state where there is a difference to the extent that the same function can be obtained.

For example, an expression representing a shape such as a quadrangular shape or a cylindrical shape does not represent only a shape such as a quadrangular shape or a cylindrical shape in a geometrically strict sense, but also a shape including an uneven portion, a chamfered portion, and the like within a range in which the same effect can be obtained.

Meanwhile, the expressions “being provided with”, “comprising”, “including”, or “having” one component are not exclusive expressions excluding the presence of other components.

FIG. 1 is a partial cross-sectional view showing a schematic configuration of a turbocharger 2 according to an embodiment. FIG. 1 shows a schematic cross section along a rotary shaft 8 of a centrifugal compressor 4 of the turbocharger 2.

As shown in FIG. 1, the turbocharger 2 includes the centrifugal compressor 4 and a turbine 12 connected to the centrifugal compressor 4. An impeller 6 of the centrifugal compressor 4 and a turbine wheel 10 of the turbine 12 are connected to each other via the rotary shaft 8. Hereinafter, a term “axial direction” used alone means an axial direction of the impeller 6, a term “radial direction” used alone means a radial direction of the impeller 6, and a term “circumferential direction” used alone means a circumferential direction of the impeller 6.

The centrifugal compressor 4 includes the impeller 6, a compressor inlet flow path 40 that extends along the axial direction such that air is guided to the impeller 6, a diffuser flow path 42 for speed reduction of an air flow passing through the impeller 6, a scroll flow path 14 that is provided on an outer peripheral side (an outer peripheral side of the diffuser flow path 42) of the impeller 6 and that has a scroll-like shape, a bypass flow path 16 that branches off from the scroll flow path 14, that bypasses the impeller 6, and that is connected to the compressor inlet flow path 40, and a bypass valve 18 that is provided in the bypass flow path 16. Hereinafter, an “upstream side in the axial direction” means an upstream side relating to an air flow in the compressor inlet flow path 40 in the axial direction, and a “downstream side in the axial direction” means a downstream side relating to an air flow in the compressor inlet flow path 40 in the axial direction.

The bypass flow path 16 includes a scroll side flow path portion 16*a* that is connected to the scroll flow path 14, a compressor inlet side flow path portion 16*b* that is connected to the compressor inlet flow path 40, and a valve body accommodation portion 16*c* that accommodates a valve body 24 of the bypass valve 18. In the exemplary embodiment shown in the drawings, the scroll side flow path portion 16*a* extends from an outlet pipe 38 of the scroll flow path 14 to a side opposite to the turbine 12 in the axial direction and is connected to the valve body accommodation portion 16*c*. The compressor inlet side flow path portion 16*b* extends outward in the radial direction from the compressor inlet flow path 40 and is connected to the valve body accommodation portion 16*c*.

An opening and closing operation of the bypass valve 18 is controlled by an actuator 19 and in a case where a discharge pressure of the centrifugal compressor 4 is excessively increased to exceed a threshold value, the bypass valve 18 is opened so that a portion of compressed air flowing in the scroll flow path 14 is returned to the compressor inlet flow path 40.

Figure 2A:
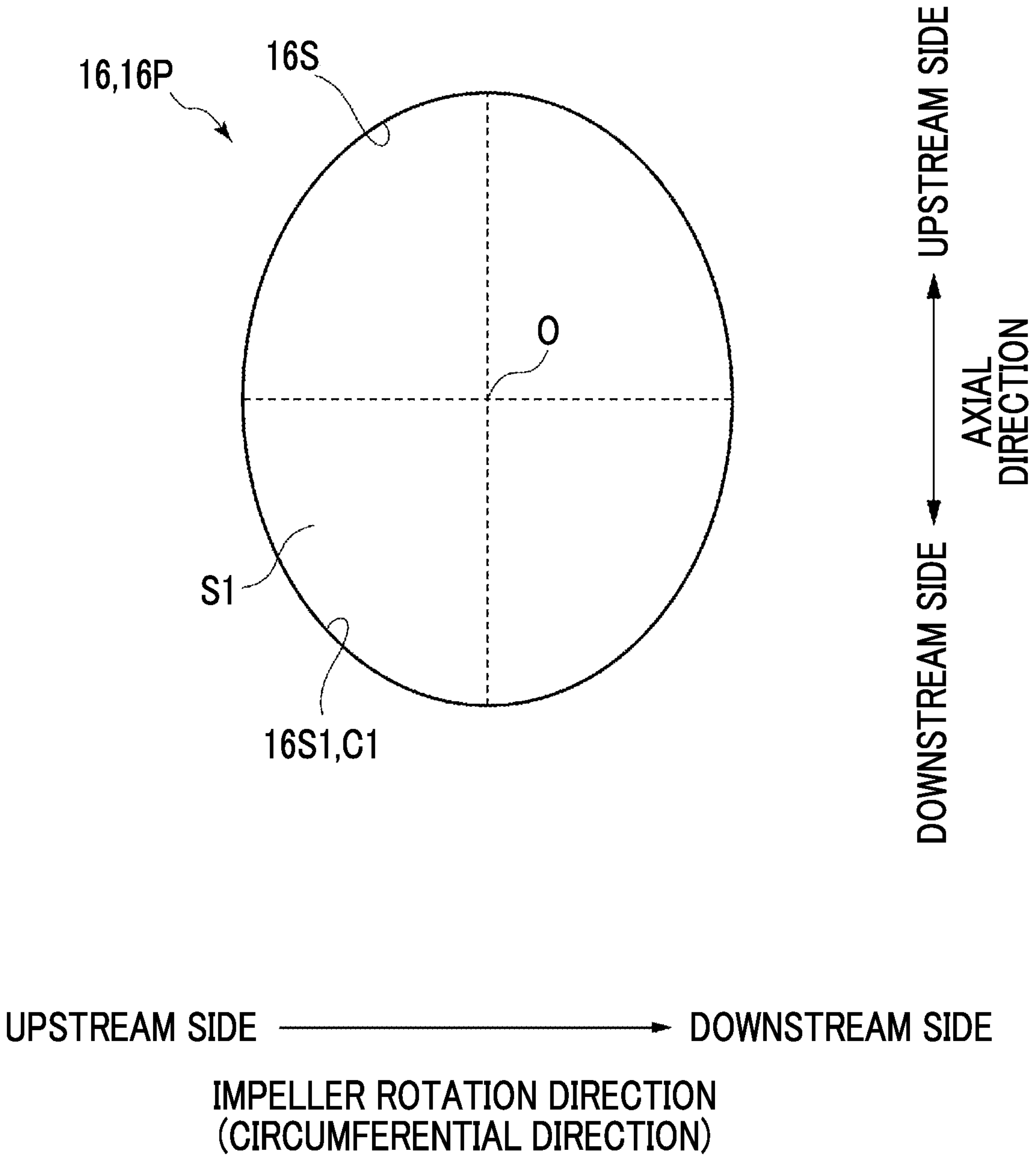
FIG. 2A is a view showing an example of a flow path cross section of a bypass flow path 16 at a connection position P where the bypass flow path 16 and a compressor inlet flow path 40 of a centrifugal compressor 4 shown in FIG. 1 are connected to each other.
Figure 2B:
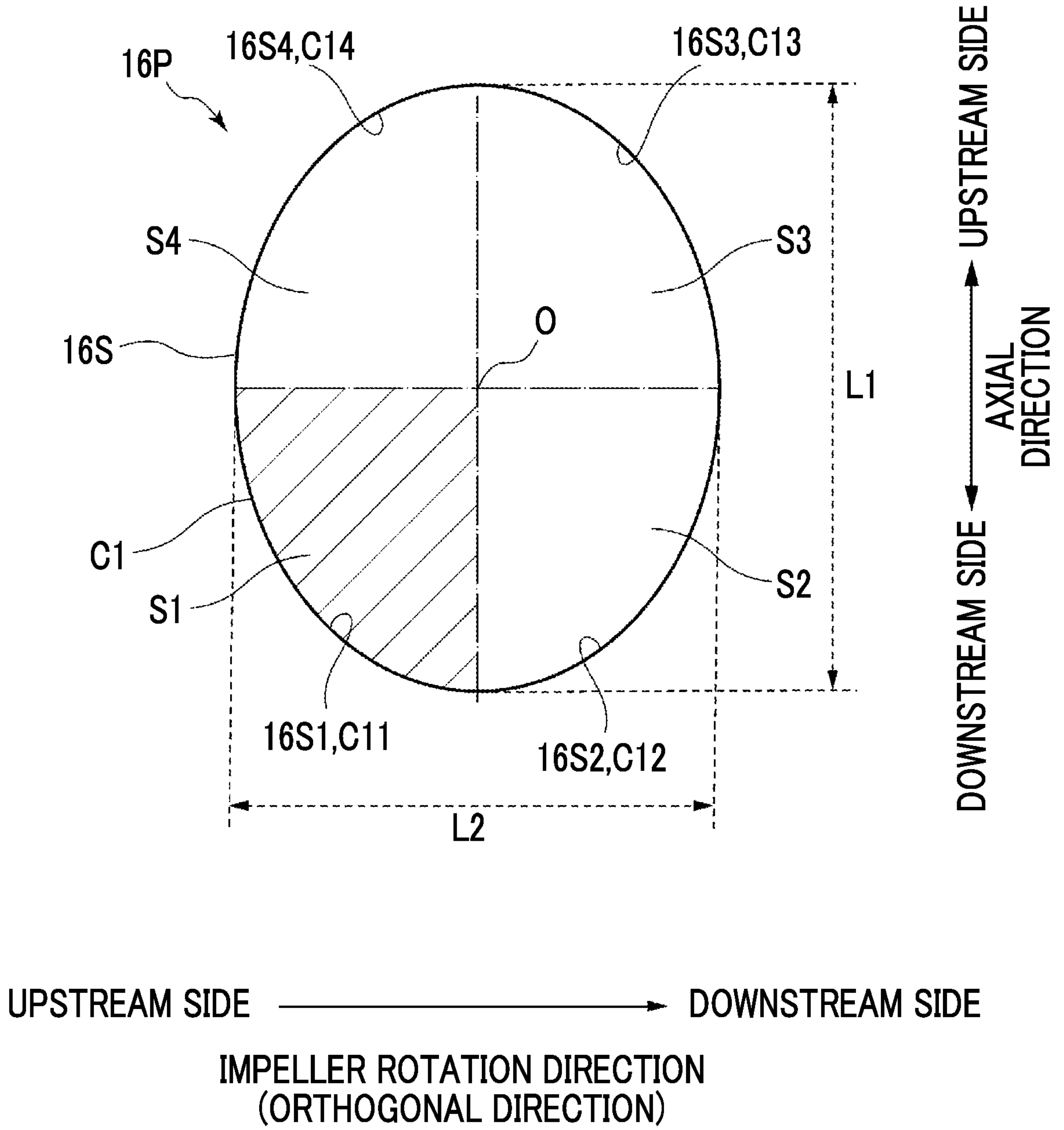
FIG. 2B is a view for description of a detailed configuration of the flow path cross section shown in FIG. 2A.

FIG. 2A is a view showing an example of a flow path cross section of the bypass flow path 16 at a connection position P where the bypass flow path 16 and the compressor inlet flow path 40 are connected to each other. FIG. 2B is a view for description of a detailed configuration of the flow path cross section shown in FIG. 2A. Note that the connection position P is the position of a boundary between the bypass flow path 16 and the compressor inlet flow path 40, that is, the position (the position of an outlet of the bypass flow path 16) of an opening end of the bypass flow path 16 that is on the compressor inlet flow path 40 side. In the present specification, the flow path cross section (the flow path cross section of the outlet of the bypass flow path 16) of the bypass flow path 16 at the connection position P will be referred to as an outlet cross section 16P of the bypass flow path 16.

In an example shown in FIGS. 2A and 2B, a flow path wall surface 16S of the bypass flow path 16 has an oval shape at the outlet cross section 16P. In addition, the oval shape of the flow path wall surface 16S at the outlet cross section 16P has a major axis that extends along the axial direction of the impeller 6 and a minor axis that extends along an orthogonal direction (a rotation direction of the impeller 6 at a center O (the center of the oval) of the outlet cross section 16P) orthogonal to each of the axial direction of the impeller 6 and the radial direction of the impeller 6 at the center O of the outlet cross section 16P. In addition, as shown in FIG. 2B, a dimension L1 of the outlet cross section 16P in the axial direction of the impeller 6 is larger than a dimension L2 of the outlet cross section 16P in the above-described orthogonal direction.

Here, as shown in FIG. 2B, regarding the outlet cross section 16P, an area (a hatched area in FIG. 2B) that is closer to the downstream side in the axial direction than the center O (a centroid of the outlet cross section 16P) of the outlet cross section 16P is and that is closer to an upstream side in the rotation direction of the impeller 6 than the center O is will be referred to as a first area S1, an area that is closer to the downstream side in the axial direction than the center O is and that is closer to a downstream side in the rotation direction of the impeller 6 than the center O is will be referred to as a second area S2, an area that is closer to the upstream side in the axial direction than the center O is and that is closer to the downstream side in the rotation direction of the impeller 6 than the center O is will be referred to as a third area S3, and an area that is closer to the upstream side in the axial direction than the center O is and that is closer to the upstream side in the rotation direction of the impeller 6 than the center O is will be referred to as a fourth area S4.

In addition, a portion of the flow path wall surface 16S of the bypass flow path 16 at the outlet cross section 16P that belongs to the first area S1 will be referred to as a first area wall surface portion 16S1, a portion of the flow path wall surface 16S of the bypass flow path 16 at the outlet cross section 16P that belongs to the second area S2 will be referred to as a second area wall surface portion 16S2, a portion of the flow path wall surface 16S of the bypass flow path 16 at the outlet cross section 16P that belongs to the third area S3 will be referred to as a third area wall surface portion 16S3, and a portion of the flow path wall surface 16S of the bypass flow path 16 at the outlet cross section 16P that belongs to the fourth area S4 will be referred to as a fourth area wall surface portion 16S4.

As shown in FIG. 2B, at least the first area wall surface portion 16S1 of the flow path wall surface 16S of the bypass flow path 16 at the outlet cross section 16P is composed of a curve C1 of which the curvature changes toward the downstream side in the axial direction. In the example shown in the drawing, each of the first area wall surface portion 16S1, the second area wall surface portion 16S2, the third area wall surface portion 16S3, and the fourth area wall surface portion 16S4 is composed of a curve of which the curvature changes toward the downstream side in the axial direction. In the example shown in the drawing, the first area wall surface portion 16S1 is composed of a curve C11 of which the curvature decreases toward the upstream side in the axial direction, the second area wall surface portion 16S2 is composed of a curve C12 of which the curvature decreases toward the upstream side in the axial direction, the third area wall surface portion 16S3 is composed of a curve C13 of which the curvature increases toward the upstream side in the axial direction, and the fourth area wall surface portion 16S4 is composed of a curve C14 of which the curvature increases toward the upstream side in the axial direction.

Figure 3:
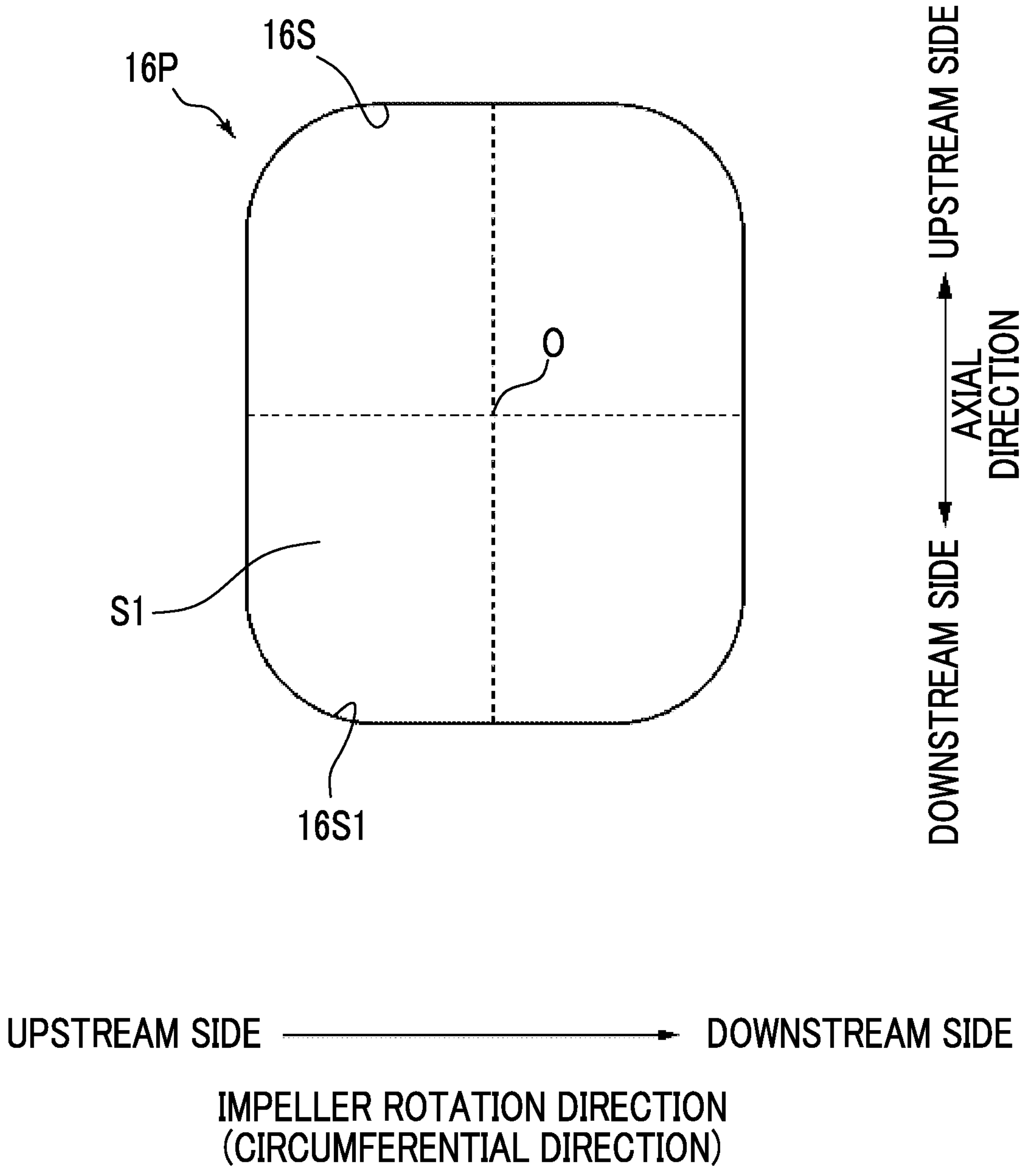
FIG. 3 is a view showing a flow path cross section of the bypass flow path 16 at the connection position P where the bypass flow path 16 and the compressor inlet flow path 40 in a comparative embodiment are connected to each other.
Figure 4:
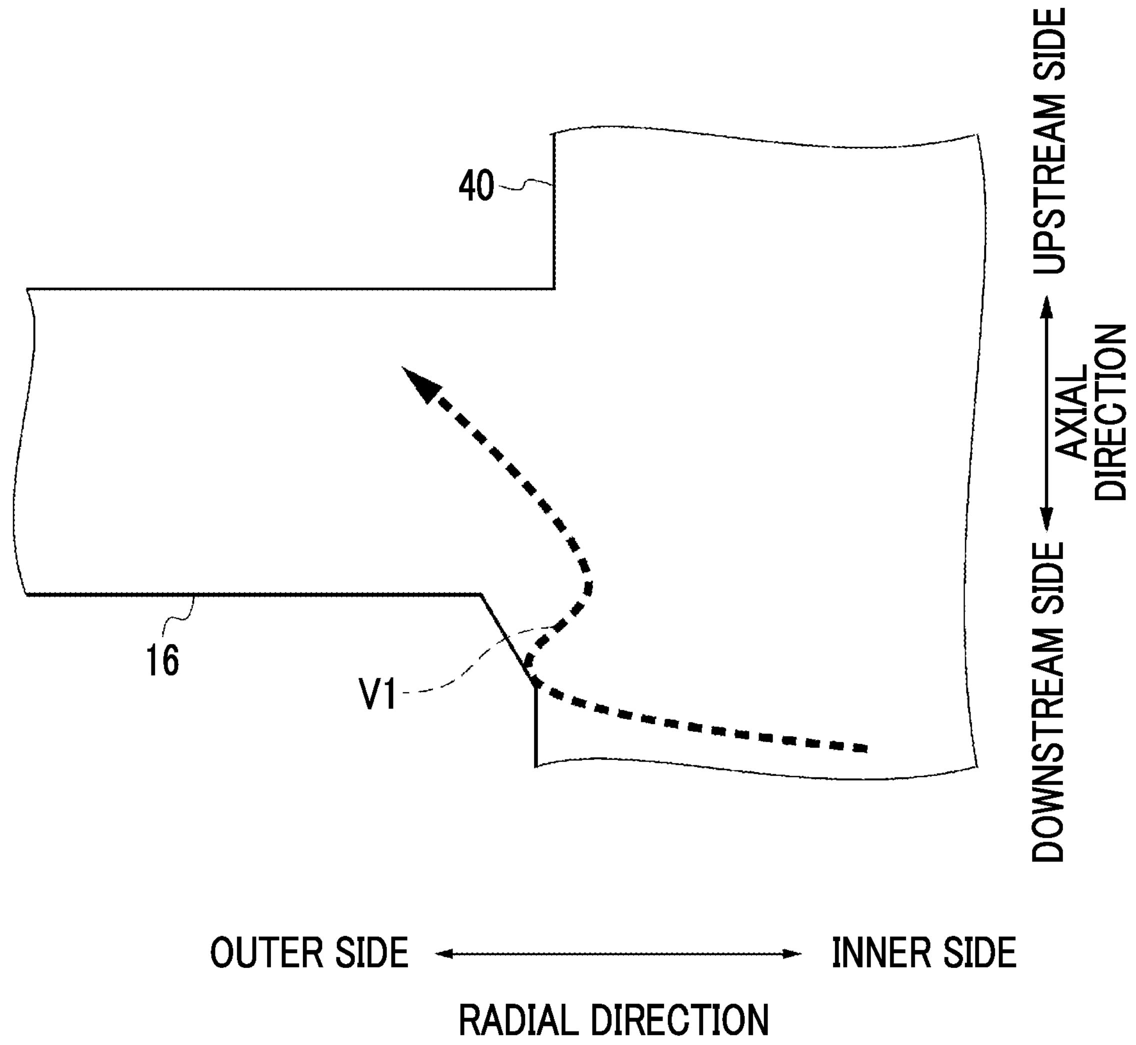
FIG. 4 is a view schematically showing how a vortex V1 flows near a connection portion between the bypass flow path 16 and the compressor inlet flow path 40 in the comparative embodiment.
Figure 5:
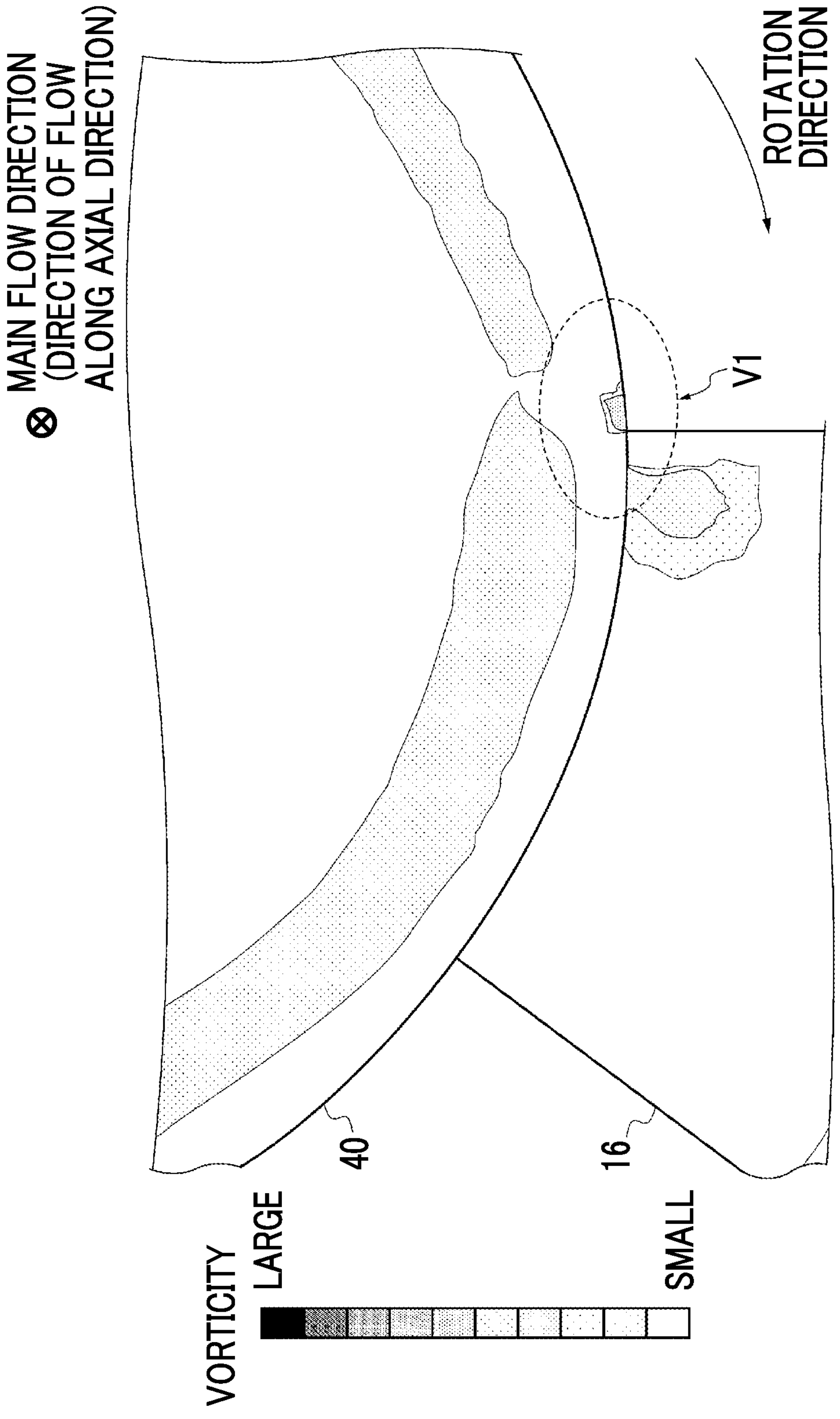
FIG. 5 is a cross-sectional view showing vorticity near the connection portion between the bypass flow path 16 and the compressor inlet flow path 40 in the comparative embodiment.

Here, the effect of the centrifugal compressor 4 will be described in comparison with a comparative embodiment in which the outlet cross section 16P has a shape as shown in FIG. 3. In the comparative embodiment shown in FIG. 3, in the outlet cross section 16P of the bypass flow path 16, the shape of the flow path wall surface 16S of the bypass flow path 16 is a round-corner square (a square having rounded corners), and each side of the round-corner square includes a linear portion. FIG. 4 is a view schematically showing how a vortex V1 flows near a connection portion between the bypass flow path 16 and the compressor inlet flow path 40 in the comparative embodiment. FIG. 5 is a cross-sectional view showing vorticity near the connection portion between the bypass flow path 16 and the compressor inlet flow path 40 in the comparative embodiment.

It is obvious that in the comparative embodiment, in a case where a backflow to the compressor inlet flow path 40 from an impeller side is generated when the centrifugal compressor 4 is operated at a small flow rate, a vortex V1 (refer to FIGS. 4 and 5) is caused by a sudden change in direction of a flow at the linear portion of the first area wall surface portion 16S1 due to the backflow in the area S1 (the area that is closer to the downstream side in the axial direction than the center O of the outlet cross section 16P is and that is closer to the upstream side in the rotation direction of the impeller 6 than the center O is) of the outlet cross section 16P of the bypass flow path 16 shown in FIG. 3, and thus, noise (an air-drawing noise) is generated due to the vortex V1.

However, in the case of the centrifugal compressor 4 in the above-described embodiment, at least the first area wall surface portion 16S1 of the flow path wall surface 16S of the bypass flow path 16 at the outlet cross section 16P is composed of the curve C1 and does not include a linear portion. Therefore, a flow is stable in comparison with the comparative embodiment, and thus, noise generated at the connection portion between the compressor inlet flow path 40 and the bypass flow path 16 can be reduced. In addition, since only the shape of the first area wall surface portion 16S1 needs to be changed, a significant improvement design is not required, and thus, costs can be suppressed.

In addition, in the case of the centrifugal compressor 4 according to the above-described embodiment, at least the first area wall surface portion 16S1 of the flow path wall surface 16S of the bypass flow path 16 at the outlet cross section 16P is composed of the curve C1 (in the example shown in the drawing, a concave curve) of which the curvature changes toward the downstream side in the axial direction. Therefore, the area of the outlet cross section 16P can be increased in comparison with the case of a cross-sectional shape of which the curvature is constant (a perfect circular shape). Therefore, a required flow path cross-sectional area can be secured without an increase in flow path width. In addition, since an increase in flow path width is suppressed, it is possible to suppress generation of a cavity flow with respect to a swirling flow and to suppress generation of noise.

In addition, as described above, in the above-described embodiment, the flow path wall surface 16S of the bypass flow path 16 has the oval shape at the outlet cross section 16P of the bypass flow path 16, the oval shape has the major axis that extends along the axial direction of the impeller 6 and the minor axis that extends along the above-described orthogonal direction, and the dimension L1 of the outlet cross section 16P in the axial direction of the impeller 6 is larger than the dimension L2 of the outlet cross section 16P in the above-described orthogonal direction. Because of each of these features, noise generated at the connection portion between the compressor inlet flow path 40 and the bypass flow path 16 can be effectively reduced. Particularly, in a case where the major axis of the oval shape is parallel to a flow in the axial direction, a large flow path area can be secured and the influence of a swirling flow is likely to be suppressed. Therefore, generation of noise (an air-drawing noise) caused by a swirling flow can be effectively reduced.

In some embodiments, for example, as shown in FIG. 1, the bypass flow path 16 includes a circular cross-sectional shape section **16*b*1 having a circular flow path cross section and a cross-sectional shape change section 16*b*2 positioned between the circular cross-sectional shape section 16*b*1 and the connection position P. In an example shown in the drawing, one end of the circular cross-sectional shape section 16*b*1 is connected to the valve body accommodation portion 16*c*, and the other end of the circular cross-sectional shape section 16*b*1 is connected to one end of the cross-sectional shape change section 16*b*2. The other end of the cross-sectional shape change section 16*b*2 is connected to the compressor inlet flow path 40**.

Here, regarding the flow path cross section at each position in the cross-sectional shape change section **16*b*2, the cross-sectional shape change section 16*b*2 is configured such that a cross section dimension ratio L1/L2 increases toward the compressor inlet flow path 40 in a case where the cross section dimension ratio L1/L2 refers to a ratio L1/L2 of the dimension L1 of the flow path cross section in the axial direction to the dimension L2 of the flow path cross section in the orthogonal direction orthogonal to each of the axial direction of the impeller 6 and the radial direction of the impeller 6**.

In such a configuration, in the circular cross-sectional shape section **16*b*1, which is a section that is somewhat separated from the connection position P and of which the influence on the above-described noise at the bypass flow path 16 is small, an increase in pressure loss can be suppressed since the circular cross-sectional shape section 16*b*1 has a simple circular flow path cross section with a small flow path resistance. In addition, since the cross section dimension ratio L1/L2 gradually increases toward the outlet cross section 16P, which is a cause of generation of the above-described noise, without being suddenly changed until the cross section dimension ratio L1/L2 becomes equal to the cross section dimension ratio L1/L2 at the outlet cross section 16**P, it is possible to achieve both suppression of an increase in pressure loss and reduction of the above-described noise.

Figure 6:
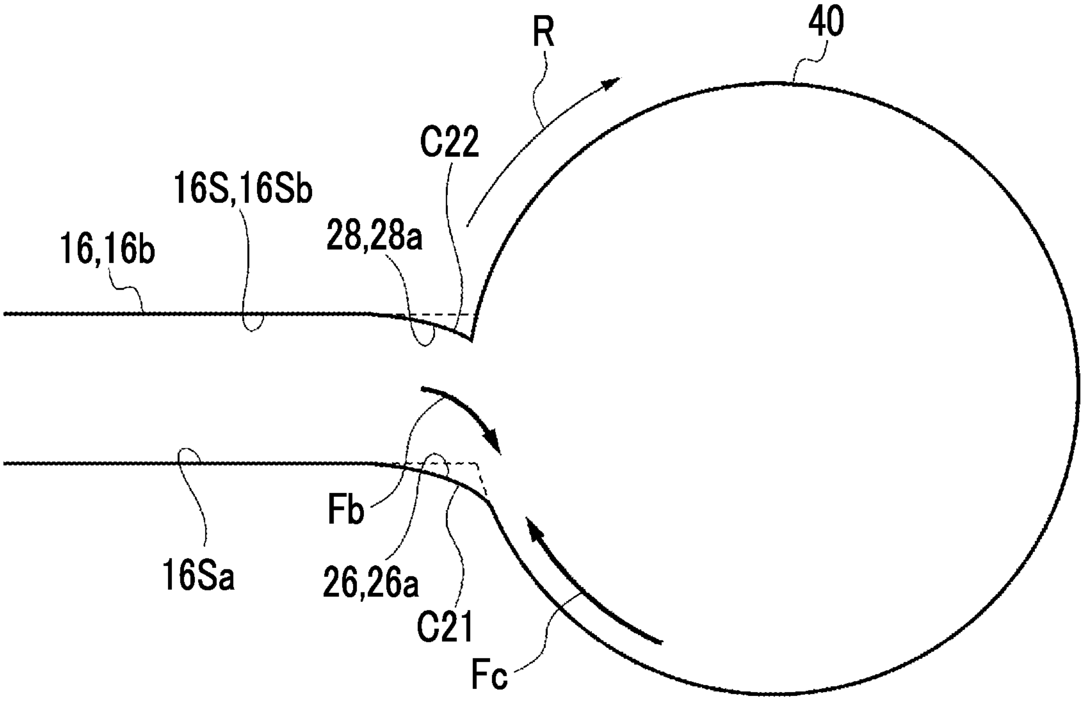
FIG. 6 is a view schematically showing an example of a cross section orthogonal to an axial direction at the connection portion between the bypass flow path 16 and the compressor inlet flow path 40 of the centrifugal compressor 4 shown in FIG. 1.

FIG. 6 is a view schematically showing an example of a cross section orthogonal to the axial direction at the connection portion between the bypass flow path 16 and the compressor inlet flow path 40 of the centrifugal compressor 4 shown in FIG. 1.

As shown in FIG. 6, the flow path wall surface 16S of the compressor inlet side flow path portion 16*b* of the bypass flow path 16 includes a first wall surface 16Sa and a second wall surface 16Sb in the cross section orthogonal to the axial direction, the second wall surface 16Sb facing the first wall surface 16Sa. In an example shown in the drawing, the first wall surface 16Sa is positioned closer to the upstream side in the rotation direction of the impeller 6 than the second wall surface 16Sb is.

In addition, at least one of the first wall surface 16Sa and the second wall surface 16Sb is formed to become closer to the upstream side in a rotation direction R of the impeller 6 toward the compressor inlet flow path 40 in a partial area adjacent to the compressor inlet flow path 40. In the example shown in the drawing, the first wall surface 16Sa is composed of a curve C21 that is gently curved to become closer to the upstream side in the rotation direction of the impeller 6 toward the compressor inlet flow path 40 in the partial area adjacent to the compressor inlet flow path 40 in the cross section orthogonal to the axial direction. In addition, the second wall surface 16Sb is composed of a curve C22 that is gently curved to become closer to the upstream side in the rotation direction of the impeller 6 toward the compressor inlet flow path 40 in the partial area adjacent to the compressor inlet flow path 40 in the cross section orthogonal to the axial direction.

In the example shown in the drawing, a fillet 26 is formed at a connection portion between the first wall surface 16Sa and the compressor inlet flow path 40, and a fillet 28 is formed at a connection portion between the second wall surface 16Sb and the compressor inlet flow path 40. In this case, a surface 26*a* of the fillet 26 is outwardly curved to become closer to the upstream side in the rotation direction of the impeller 6 toward the compressor inlet flow path 40 in the cross section orthogonal to the axial direction, and the curve C21 is composed of the surface 26*a* of the fillet 26. In addition, a surface 28*a* of the fillet 28 is inwardly curved to become closer to the upstream side in the rotation direction of the impeller 6 toward the compressor inlet flow path 40 in the cross section orthogonal to the axial direction, and the curve C22 is composed of the surface 28*a* of the fillet 28.

According to the configuration shown in FIG. 6, a flow Fb flowing out from the bypass flow path 16 is curved toward the upstream side in the rotation direction R of the impeller 6. Meanwhile, the above-described backflow from the impeller 6 has a swirling component Fc in the same direction as the rotation direction of the impeller 6. Therefore, since the flow Fb flowing out from the bypass flow path 16 is curved toward the upstream side in the rotation direction R of the impeller 6, the flow Fb faces the swirling component Fc of the above-described backflow from the impeller 6 and cancels out the backflow, so that generation of the above-described vortex can be suppressed. Accordingly, noise generated at the connection portion between the compressor inlet flow path 40 and the bypass flow path 16 can be effectively reduced.

The present disclosure is not limited to the above-described embodiments, and includes modifications of the above-described embodiments and a combination of these embodiments as appropriate.

For example, in the above-described embodiment, a case where the flow path wall surface 16S of the bypass flow path 16 has an oval shape at the outlet cross section 16P has been described. However, the shape of the flow path wall surface 16S of the bypass flow path 16 at the outlet cross section 16P is not limited to an oval shape as long as at least the first area wall surface portion 16S1 is composed of a curve. The shape of the flow path wall surface 16S of the bypass flow path 16 at the outlet cross section 16P may be, for example, a shape as shown in FIG. 7, a shape as shown in FIG. 8, and the like, and may be a curve of which the curvature changes toward the downstream side in the axial direction or a perfect circle.

Figure 7:
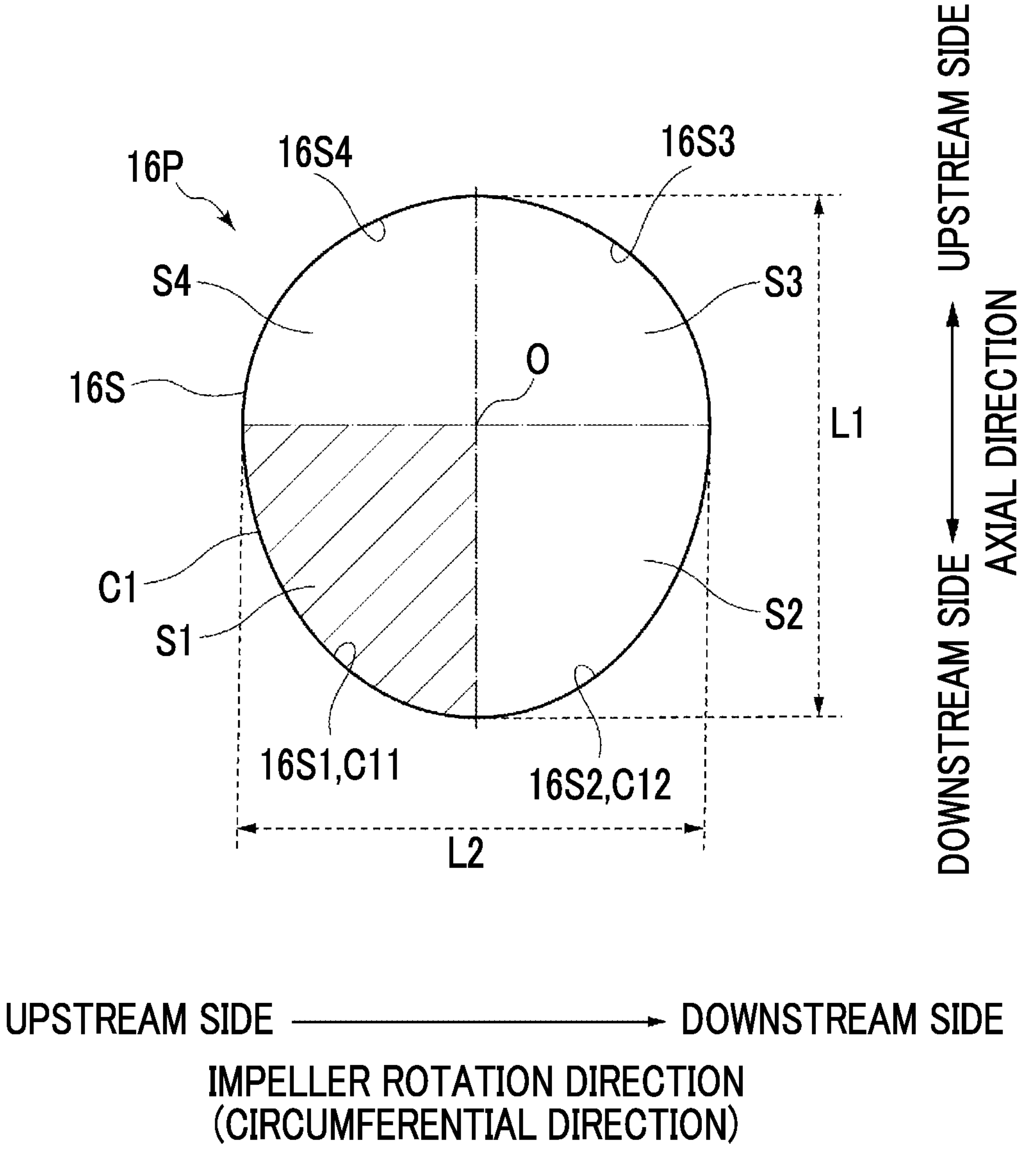
FIG. 7 is a view showing an example of a flow path cross section of the bypass flow path 16 at the connection position P where the bypass flow path 16 and the compressor inlet flow path 40 in a comparative embodiment are connected to each other.

In an example of the outlet cross section 16P that is shown in FIG. 7, the first area wall surface portion 16S1 and the second area wall surface portion 1682 are composed of a half of an oval, and the third area wall surface portion 16S3 and the fourth area wall surface portion 16S4 are composed of a half of a circle, the first to fourth areas S1 to S4 and the first to fourth area wall surface portions 16S1 to 16S4 being defined as described above. In the example shown in FIG. 7, a dimension of the outlet cross section 16P in the axial direction is larger than a dimension of the outlet cross section 16P in the orthogonal direction orthogonal to the axial direction and the radial direction.

Figure 8:
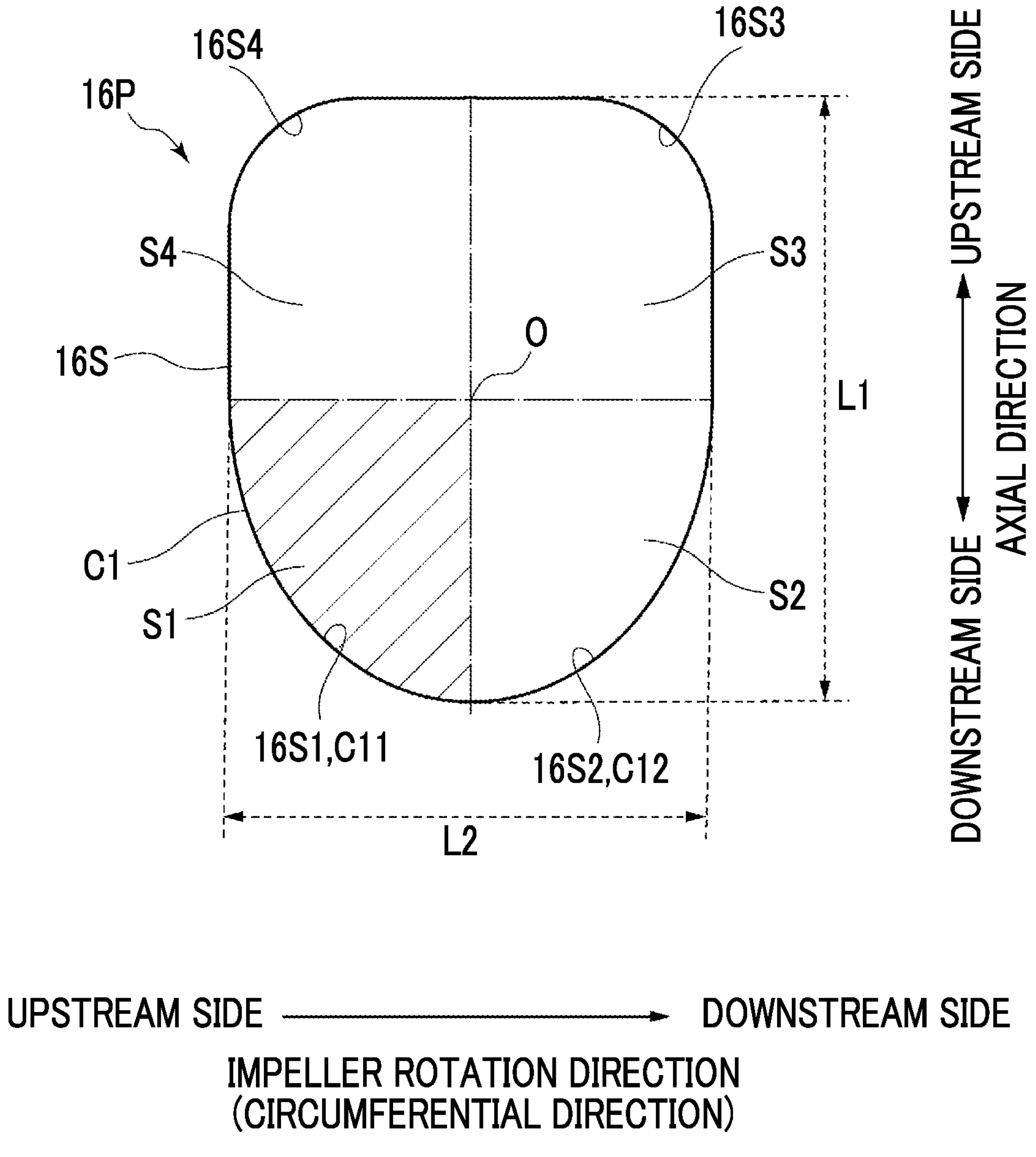
FIG. 8 is a view showing an example of a flow path cross section of the bypass flow path 16 at the connection position P where the bypass flow path 16 and the compressor inlet flow path 40 in a comparative embodiment are connected to each other.

In an example of the outlet cross section 16P that is shown in FIG. 8, the first area wall surface portion 16S1 and the second area wall surface portion 16S2 are composed of a half of an oval and the third area wall surface portion 16S3 and the fourth area wall surface portion **16*s*4 are composed of a half of a round-corner rectangle, the first to fourth areas S1 to S4 and the first to fourth area wall surface portions 16S1 to 16S4 being defined as described above. In the example shown in FIG. 7, a dimension of the outlet cross section 16P in the axial direction is larger than a dimension of the outlet cross section 16**P in the orthogonal direction orthogonal to the axial direction and the radial direction.

In both the configuration shown in FIG. 7 and the configuration shown in FIG. 8, at least the first area wall surface portion 16S1 is composed of a curve of which the curvature changes toward the downstream side in the axial direction and does not include a linear portion. Therefore, noise generated at the connection portion between the compressor inlet flow path 40 and the bypass flow path 16 can be effectively reduced.

For example, the contents described in each embodiment are understood as follows.

(1) A centrifugal compressor according to at least one embodiment of the present disclosure includes an impeller, a compressor inlet flow path through which air is guided to the impeller, a scroll flow path that is provided on an outer peripheral side of the impeller, and a bypass flow path that branches off from the scroll flow path, that bypasses the impeller, and that is connected to the compressor inlet flow path, in which, in a case where an outlet cross section of the bypass flow path refers to a flow path cross section of the bypass flow path at a connection position where the bypass flow path and the compressor inlet flow path are connected to each other, a first area refers to an area of the outlet cross section that is closer to a downstream side in an axial direction of the impeller than a center of the outlet cross section is and that is closer to an upstream side in a rotation direction of the impeller than the center is, and a first area wall surface portion refers to a portion of a flow path wall surface of the bypass flow path at the outer cross section that belongs to the first area, at least the first area wall surface portion of the flow path wall surface of the bypass flow path at the outlet cross section is composed of a curve.

According to the study by the inventor of the present application, it is obvious that in a case where a backflow to the compressor inlet flow path from an impeller side is generated when the centrifugal compressor is operated at a small flow rate and the first area wall surface portion includes a linear portion, a vortex is generated at the linear portion of the first area wall surface portion due to the backflow, and thus, noise (air-drawing noise) is generated due to the vortex.

However, in the case of the centrifugal compressor described in (1) as above, at least the first area wall surface portion of the flow path wall surface of the bypass flow path at the outlet cross section is composed of only the curve and does not include a linear portion. Therefore, a flow is stable in comparison with a case where the first area wall surface portion includes a linear portion, and thus, noise generated at a connection portion between the compressor inlet flow path and the bypass flow path can be reduced.

(2) In some embodiments, in the centrifugal compressor described in (1) as above, at least the first area wall surface portion of the flow path wall surface of the bypass flow path at the outlet cross section is composed of a curve of which a curvature changes toward the downstream side in the axial direction.

According to the centrifugal compressor described in (2) as above, the area of the outlet cross section can be increased in comparison with the case of a cross-sectional shape of which the curvature is constant (a perfect circular shape). Therefore, a required flow path cross-sectional area can be secured without an increase in flow path width. In addition, since an increase in flow path width is suppressed, it is possible to suppress generation of a cavity flow with respect to a swirling flow and to suppress generation of noise. In addition, since only the shape of the first area wall surface portion needs to be changed, a significant improvement design is not required, and thus, costs can be suppressed.

(3) In some embodiments, in the centrifugal compressor described in (2) as above, a dimension of the outlet cross section in the axial direction is larger than a dimension of the outlet cross section in an orthogonal direction orthogonal to each of the axial direction and a radial direction of the impeller.

According to the centrifugal compressor described in (3) as above, noise generated at the connection portion between the compressor inlet flow path and the bypass flow path can be effectively reduced.

(4) In some embodiments, in the centrifugal compressor described in (3) as above, the bypass flow path includes a circular cross-sectional shape section having a circular flow path cross section and a cross-sectional shape change section positioned between the circular cross-sectional shape section and the connection position, and regarding the flow path cross section at each position in the cross-sectional shape change section, the cross-sectional shape change section is configured such that a cross section dimension ratio increases toward the compressor inlet flow path in a case where the cross section dimension ratio refers to a ratio of a dimension of the flow path cross section in the axial direction to a dimension of the flow path cross section in the orthogonal direction.

According to the centrifugal compressor described in (4) as above, in the circular cross-sectional shape section, which is a section that is somewhat separated from the connection position and of which the influence to the above-described noise at the bypass flow path is small, increase in pressure loss can be suppressed since the circular cross-sectional shape section has a simple circular flow path cross section with a small flow path resistance. In addition, since the cross section dimension ratio increases toward the outlet cross section, which is a cause of generation of the above-described noise, it is possible to achieve both suppression of an increase in pressure loss and reduction of the above-described noise.

(5) In some embodiments, in the centrifugal compressor described in any one of (2) to (4) as above, at least the first area wall surface portion of the flow path wall surface of the bypass flow path at the outlet cross section is composed of a curve of which a curvature decreases toward an upstream side in the axial direction.

According to the centrifugal compressor described in (5) as above, noise generated at the connection portion between the compressor inlet flow path and the bypass flow path can be effectively reduced.

(6) In some embodiments, in the centrifugal compressor described in any one of (2) to (5) as above, the flow path wall surface of the bypass flow path at the outlet cross section has an oval shape.

According to the centrifugal compressor described in (6) as above, noise generated at the connection portion between the compressor inlet flow path and the bypass flow path can be effectively reduced.

(7) In some embodiments, in the centrifugal compressor described in (6) as above, the oval shape of the flow path wall surface at the outlet cross section has a major axis that extends along the axial direction and a minor axis that extends along a direction orthogonal to each of the axial direction and a radial direction of the impeller.

According to the centrifugal compressor described in (7) as above, noise generated at the connection portion between the compressor inlet flow path and the bypass flow path can be effectively reduced.

(8) In some embodiments, in the centrifugal compressor described in any one of (2) to (7) as above, the flow path wall surface of the bypass flow path includes a first wall surface and a second wall surface in a cross section orthogonal to the axial direction of the impeller, the second wall surface facing the first wall surface, and at least one of the first wall surface and the second wall surface is formed to become closer to the upstream side in the rotation direction toward the compressor inlet flow path in a partial area adjacent to the compressor inlet flow path.

According to the centrifugal compressor described in (8) as above, a flow flowing out to the compressor inlet flow path from the bypass flow path is curved toward the upstream side in the rotation direction of the impeller. Meanwhile, the above-described backflow from the impeller has a swirling component in the same direction as the rotation direction of the impeller. Therefore, since the flow flowing out from the bypass flow path is curved toward the upstream side in the rotation direction of the impeller, the flow faces the swirling component of the above-described backflow from the impeller and cancels out the backflow, so that generation of the above-described vortex can be suppressed. Accordingly, noise generated at the connection portion between the compressor inlet flow path and the bypass flow path can be effectively reduced.

(9) In some embodiments, in the centrifugal compressor described in (8) as above, the first wall surface is positioned closer to the upstream side in the rotation direction of the impeller than the second wall surface is, and a fillet is formed at a connection portion between the first wall surface and the compressor inlet flow path, and a surface of the fillet is outwardly curved to become closer to the upstream side in the rotation direction of the impeller toward the compressor inlet flow path in the cross section orthogonal to the axial direction.

According to the centrifugal compressor described in (9) as above, it is possible to achieve an effect described in (8) as above while suppressing stress concentration in the connection portion between the first wall surface of the bypass flow path and the compressor inlet flow path with the fillet.

(10) In some embodiments, in the centrifugal compressor described in (8) or (9) as above, the first wall surface is positioned closer to the upstream side in the rotation direction of the impeller than the second wall surface is, and a fillet is formed at a connection portion between the second wall surface and the compressor inlet flow path, and a surface of the fillet is inwardly curved to become closer to the upstream side in the rotation direction of the impeller toward the compressor inlet flow path in the cross section orthogonal to the axial direction.

According to the centrifugal compressor described in (10) as above, it is possible to achieve an effect described in (7) as above while suppressing stress concentration in the connection portion between the second wall surface of the bypass flow path and the compressor inlet flow path with the fillet.

(11) A turbocharger according to at least one embodiment of the present disclosure includes the centrifugal compressor described in any one of (2) to (10) as above, and a turbine that is connected to the centrifugal compressor via a rotary shaft.

According to the turbocharger described in (11) as above, noise generated at the connection portion between the compressor inlet flow path and the bypass flow path can be effectively reduced since the centrifugal compressor described in any one of (1) to (10) as above is provided.

REFERENCE SIGNS LIST

- 2: turbocharger
- 4: centrifugal compressor
- 6: impeller
- 8: rotary shaft
- 10: turbine wheel
- 12: turbine
- 14: scroll flow path
- 16: bypass flow path
- 16P: outlet cross section
- 16S: flow path wall surface
- 16S1: first area wall surface portion
- 16S2: second area wall surface portion
- 16S3: third area wall surface portion
- 16S4: fourth area wall surface portion
- 16Sa: first wall surface
- 16Sb: second wall surface
- 16*a*: scroll side flow path portion
- 16*b*: compressor inlet side flow path portion
- 16*b*1: circular cross-sectional shape section
- 16*b*2: cross-sectional shape change section
- 16*c*: valve body accommodation portion
- 18: bypass valve
- 19: actuator
- 24: valve body
- 26, 28: fillet
- 26*a*, 28*a*: surface
- 38: outlet pipe
- 40: compressor inlet flow path
- 42: diffuser flow path

The invention claimed is:

1. A centrifugal compressor comprising:

an impeller;

a compressor inlet flow path through which air is guided to the impeller;

a scroll flow path that is provided on an outer peripheral side of the impeller; and a bypass flow path that branches off from the scroll flow path, that bypasses the impeller, and that is connected to the compressor inlet flow path, wherein, when an outlet cross section of the bypass flow path refers to a flow path cross section of the bypass flow path at a connection position where the bypass flow path and the compressor inlet flow path are connected to each other, and the flow path cross section of the bypass flow path being viewed along a direction orthogonal to an axial direction of the impeller, a first area refers to an area of the outlet cross section that is closer to a downstream side in an axial direction of the impeller than a center of the outlet cross section is and that is closer to an upstream side in a rotation direction of the impeller than the center is, and a first area wall surface portion refers to a portion of a flow path wall surface of the bypass flow path at the outlet cross section that belongs to the first area, at least the first area wall surface portion of the flow path wall surface of the bypass flow path at the outlet cross section is composed of a curve, and wherein at least the first area wall surface portion of the flow path wall surface of the bypass flow path at the outlet cross section is composed of a curve of which a curvature changes toward the downstream side in the axial direction.

2. The centrifugal compressor according to claim 1, wherein a dimension of the outlet cross section in the axial direction is larger than a dimension of the outlet cross section in an orthogonal direction orthogonal to each of the axial direction and a radial direction of the impeller.

3. The centrifugal compressor according to claim 2, wherein the bypass flow path includes a circular cross-sectional shape section having a circular flow path cross section and a cross-sectional shape change section positioned between the circular cross-sectional shape section and the connection position, and regarding the flow path cross section at each position in the cross-sectional shape change section, the cross-sectional shape change section is configured such that a cross section dimension ratio increases toward the compressor inlet flow path in a case where the cross section dimension ratio refers to a ratio of a dimension of the flow path cross section in the axial direction to a dimension of the flow path cross section in the orthogonal direction.

4. The centrifugal compressor according to claim 1, wherein at least the first area wall surface portion of the flow path wall surface of the bypass flow path at the outlet cross section is composed of a curve of which a curvature decreases toward an upstream side in the axial direction.

5. The centrifugal compressor according to claim 1, wherein the flow path wall surface of the bypass flow path at the outlet cross section has an oval shape.

6. The centrifugal compressor according to claim 5, wherein the oval shape of the flow path wall surface at the outlet cross section has a major axis that extends along the axial direction and a minor axis that extends along a direction orthogonal to each of the axial direction and a radial direction of the impeller.

7. The centrifugal compressor according to claim 1, wherein the flow path wall surface of the bypass flow path includes a first wall surface and a second wall surface in a cross section orthogonal to the axial direction of the impeller, the second wall surface facing the first wall surface, and at least one of the first wall surface and the second wall surface is formed to become closer to the upstream side in the rotation direction toward the compressor inlet flow path in a partial area adjacent to the compressor inlet flow path.

8. The centrifugal compressor according to claim 7, wherein the first wall surface is positioned closer to the upstream side in the rotation direction of the impeller than the second wall surface is, and a fillet is formed at a connection portion between the first wall surface and the compressor inlet flow path and a surface of the fillet is outwardly curved to become closer to the upstream side in the rotation direction of the impeller toward the compressor inlet flow path in the cross section orthogonal to the axial direction.

9. The centrifugal compressor according to claim 7, wherein the first wall surface is positioned closer to the upstream side in the rotation direction of the impeller than the second wall surface is, and a fillet is formed at a connection portion between the second wall surface and the compressor inlet flow path and a surface of the fillet is inwardly curved to become closer to the upstream side in the rotation direction of the impeller toward the compressor inlet flow path in the cross section orthogonal to the axial direction.

10. A turbocharger comprising:

the centrifugal compressor according to claim 1; and a turbine that is connected to the centrifugal compressor via a rotary shaft.

* * * * *